United States Patent [19]
Gauchet

[11] 3,709,518
[45] Jan. 9, 1973

[54] METHOD AND DEVICE FOR MANEUVERING THE STABILIZING STAYS OF A MECHANICAL EARTH-WORKING VEHICLE

[75] Inventor: Yves M. Gauchet, Senlis, France

[73] Assignee: Societe Anonyme Poclain Le Plessis-Belleville, Oise, France

[22] Filed: April 10, 1970

[21] Appl. No.: 27,384

[30] Foreign Application Priority Data

April 11, 1969 France..................................6911249

[52] U.S. Cl..............................................280/150.5
[51] Int. Cl..................................................B60s 9/02
[58] Field of Search ..280/150 C, 150.5 G; 248/56 H; 212/145; 91/411 R, 412 R

[56] References Cited

UNITED STATES PATENTS

| | | | |
|---|---|---|---|
| 3,442,530 | 5/1969 | Guinot | 280/150.5 |
| 3,550,294 | 12/1970 | Fewell | 280/150.5 X |
| 2,653,624 | 9/1953 | Klessig | 91/412 X |
| 2,750,204 | 6/1956 | Ohrmann | 280/150 C |
| 2,864,625 | 12/1958 | Clements | 212/145 X |
| 3,002,760 | 10/1961 | Lee | 91/412 X |
| 3,397,898 | 8/1968 | Denney et al. | 280/150 C |

FOREIGN PATENTS OR APPLICATIONS 1,407,232 6/1965 France..................................254/86 H

*Primary Examiner*—Kenneth H. Betts
*Assistant Examiner*—Robert R. Song
*Attorney*—John Lezdey

[57] ABSTRACT

This invention relates to a method for extending the stabilizing stays of a mechanical earth-working vehicle, comprising at least two groups of stays capable of abutting on the ground, according to which method the stays of the first group are extended until they abut on fixed stops, wherein the stays of the second group are simultaneously extended into an intermediate position between the positions stays extended and stays retracted, determined as a function of the shape of the vehicle. The invention also relates to a stabilizing device applying the method as described above, wherein the stays are attached to hydraulic rams distributed in at least two groups capable of being supplied by a source of pressurized fluid, wherein an output divider is connected to the source of pressurized fluid by a conduit and to each of the two groups of stays by a conduit separated by a group of stays.

3 Claims, 2 Drawing Figures

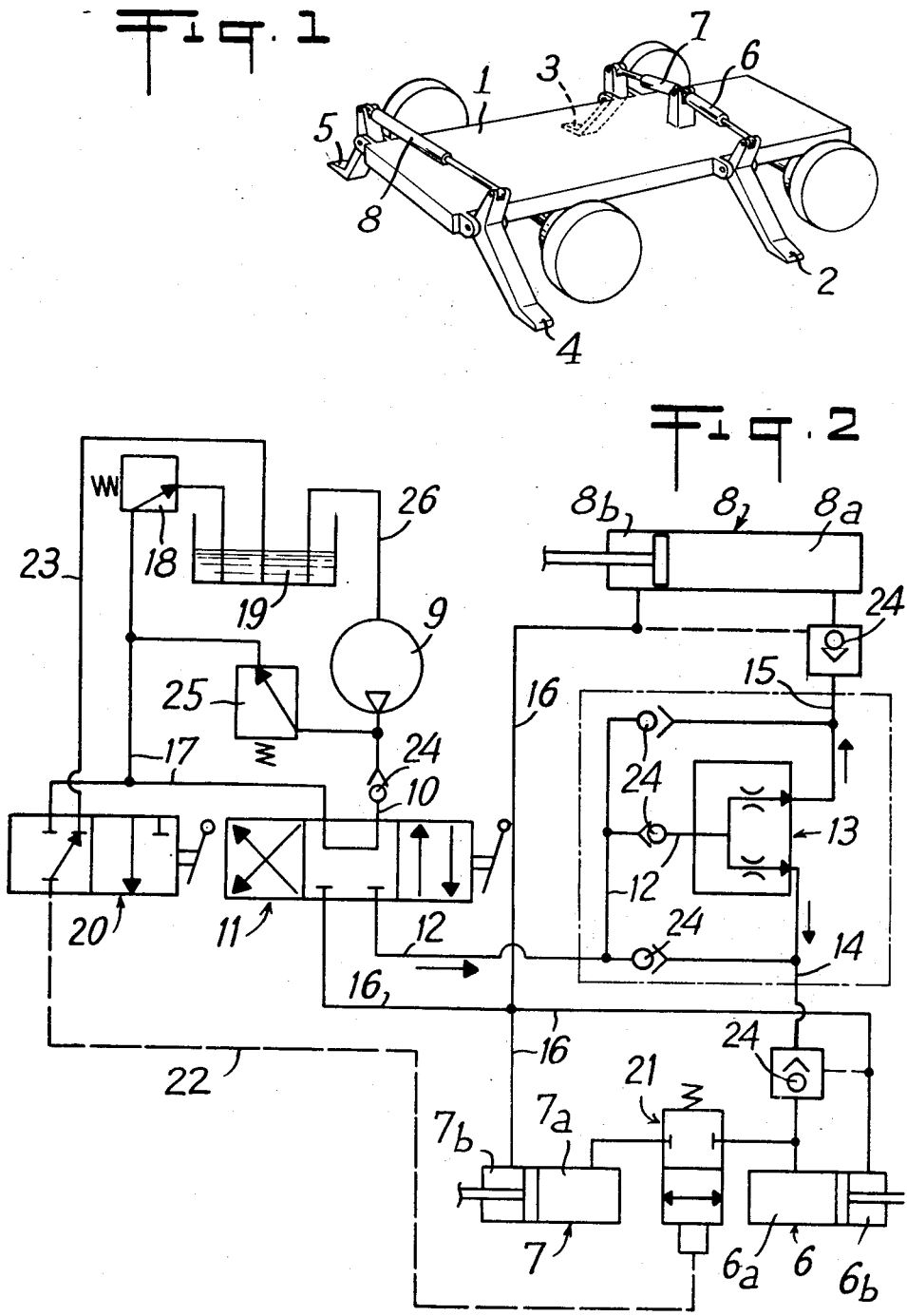

METHOD AND DEVICE FOR MANEUVERING THE STABILIZING STAYS OF A MECHANICAL EARTH-WORKING VEHICLE

The present invention relates to a method and device for maneuvering stabilizing stays or props in a mechanical earth-working vehicle.

In the field of mechanical earth-working vehicles, it is well known that there are many vehicles which can only operate correctly after having been immobilized on the ground by means of stabilizing stays.

A method is known for extending these stays, according to which the descent of the stays is arrested as soon as said latter are placed on the ground. The use of this method generally results in a scotching which deteriorates relatively quickly, so that, in order to maintain a sufficient stabilization, it is necessary frequently to reset the scotching.

According to another method, the stays are brought into mechanical abutment on the chassis of the vehicle on which they are articulated. This method is efficient but the stabilization device is often bulky.

It has therefore appeared necessary to improve the known methods and devices, in particular so as to be certain that, in the devices comprising at least two groups of stays, when one of the groups of stays is locked in completely extended position, the stays of the other group are not only in contact with the ground but also in abutment thereon.

The invention therefore has for its object firstly a new method for extending the stabilizing stays and then a particular device for stabilizing a vehicle by means of stays.

The invention firstly has for its object a method for extending the stabilizing stays of a mechanical earth-working vehicle comprising at least two groups of stays capable of abutting on the ground, according to which method the stays of the first group are extended until they abut on fixed stops. The stays of the second group are simultaneously extended into a given intermediate position between the completely extended and completely retracted positions of said stays, said intermediate position being determined solely as a function of the shape of the vehicle. The intermediate position is further defined as being that position wherein all the stays are on the ground but not all are fully extended and the wheels of the vehicle are all off the ground.

The invention also has for its object a stabilizing device in which the stays are attached to hydraulic rams distributed in at least two groups capable of being supplied with a source of pressurized fluid. An output divider is connected to the pressurized fluid source by a conduit and to each of the two groups of stays by a separate conduit per group of stays.

In a preferred embodiment, the second group of stays comprises two stays, to each of which is attached a rim, while a control valve is capable of selectively communicating two homologous chambers of the rams of said second group of stays together and with the conduit connecting said group of stays to the output divider and of isolating said chambers.

The control valve is advantageously placed in selective communication with the return conduit for the fluid of the rams of the second group of stays and with a discharge reservoir, by means of a two-way distributor.

The invention will be described in greater detail with reference to the accompanying drawings, in which:

FIG. 1 is a partial and schematic perspective view of a vehicle provided with a stabilizing device according to the invention.

FIG. 2 shows the control circuit of a stabilization device according to the invention.

Referring now to the drawings, the vehicle shown partially in FIG. 1 comprises a chassis 1, provided with front stabilizing stays 2 and 3 and rear stabilizing stays 4 and 5. The stays are articulated to the chassis 1 and are controlled by hydraulic rams; the rams 6 and 7 being attached respectively between chassis 1 and stays 2 and 3, and ram 8 coupled between stays 4 and 5.

The control circuit of stays 2 to 5 comprises a source of pressurized fluid 9, such as a hydraulic pump for example, connected by a conduit 10 to a three-way slide valve distributor 11. A conduit 12 connects the distributor 11 to an output divider 13 to each of the two groups of rams 6 and 7, and 8 for controlling the stays. The conduit 15 supplies the chamber 8a of the ram 8 in the extending direction of stays 4 and 5, while conduit 14 also feeds the chambers 6a and 7a of rams 6 and 7 in the extending direction of stays 2 and 3.

Moreover, chambers 6b, 7b and 8b of rams 6, 7 and 8, opposite chambers 6a, 7a, and 8a, are connected by conduits 16 to the distributor 11. A conduit 17 is arranged in line with the conduit 16 which stops at the distributor 11 and, by means of a calibrated valve 18, connects the distributor 11 to the discharge reservoir 19.

A second two-way slide valve distributor 20 selectively places a control valve 21, interposed on the supply of the chambers 6a and 7a of the rams 6 and 7, in communication with the conduit 17 throught a conduit 22 and with the discharge reservoir 19 through conduit 22 and through a complementary conduit 23.

Of course, non-return valves 24 have been judiciously arranged on the different conduits in order to ensure a given path for the fluid in the different branches of the control circuit. Similarly, a calibrated valve 25 avoids excess pressures in the conduit 10 which it places in communication with the conduit 17 and, through said latter and the valve 18, with the discharge reservoir 19. Finally, an aspiration conduit 26 connects the pump 9 to the reservoir 19.

The operation of the vehicle described hereinabove is as follows:

The distributors 11 and 20 are firstly arranged as shown in FIG. 2. The fluid exhausted by the pump 9 in the tank 19 through the conduit 26 is delivered under pressure in the conduit 10. It is arrested by the distributor 11 and returns through conduit 17 and the valve 18 to the reservoir 19. In this configuration, the reservoir 19 is obturated by the distributor 20.

If the slides of the distributors 11 and 20 are now arranged by pushing both towards the left, the conduit 12 is supplied with pressurized fluid coming from the pump 9. The fluid is directed towards the output divider 13 which separates the main output into two secondary outputs which are in a given fixed ratio and are directed respectively in conduits 14 and 15.

The control valve 21 is, at the beginning of the operation, in the position shown in FIG. 2. The fluid in the conduits 14 and 15 thus penetrates into the chambers 6a and 8a of the rams 6 and 8 and pushes the pistons of said rams out. Fluid is then driven out of the chambers 6b and 8b and, through the conduits 16 and the distributor 11, reaches the conduit 17. The valve 18 maintains the pressure in the conduit 17, so that the fluid in this conduit 17, through the distributor 20 and conduit 22, reaches the control valve 21. This latter is re pelled into the position which correspond to the placing into communication of chambers 6a and 7a of the rams 6 and 7. If, after the valve 21 has been controlled, excess fluid is found in conduits 17 and 22, this fluid returns to the reservoir 19 through the calibrated valve 18. The stays 4 and 5 are articulated about a given axis. The portions of the lower branches of these stays 4 and 5, which are in the neighborhood of the articulation of the corresponding stays, come into contact with the corresponding lateral side of the chassis 1. The ram 8 is locked, so that the output supplying its chamber 8a becomes zero. The output divider 13, transmitting the output of the conduit 12 to the two conduits 14 and 15 in a given ratio and transmitting nothing through conduit 15, also transmits nothing more through conduit 14. The stays 2 and 3 thus take an intermediate position of equilibrium between the completely extended or retracted extreme position. This intermediate position is sufficient to ensure a firm abutment of the stays on the ground. It is understood that the intermediate position on a flat ground corresponds to the configuration in which the wheels of the vehicle are raised off the ground.

There is a constant ratio between the outputs of fluids passing through conduits 14 and 15. Divider 13 provides the control to ensure the proper distribution of fluid. Therefore, when ram 8 is completely extended out, i.e., when the output in the conduit 15 becomes zero, the output in the conduit 14 also becomes zero. At this moment there is a constant ratio between the volume of the chamber 8a of ram 8 and the volume of chambers 6a and 7a of rams 6 and 7 so that whichever one of the stays 2 and 3 comes first in abutment on the ground, the sum of the volumes of the chambers 6a and 7a together will be constant as soon as the ram 8 is completely extended out.

Therefore, it can be seen that the full extension of stays 4 and 5 of the first group will be effected only after they abut on the chassis 1. However, stays 2 and 3 of the second group of stays are in abutment with the ground and are immobilized momentarily in an intermediate position between the retracted and fully extended positions with all of the wheels of the vehicle off the ground surface. It is at this position that one of the advantages of the present invention lies. The stays 2 and 3 will be immobilized permanently in various positions depending on the shape of the ground when the vehicle is ready for operation.

If the stay 2 rapidly abuts on the ground, the fluid circulating in the conduit 14 will cause only ram 7 and stay 3 to extend out until the sum of the chambers 6a and 7a corresponds to the complete extension of the ram 8.

It is sufficient to return the distributor 11 into its initial median position, which is its rest position, and to return the distributor 20 into its initial position in order to isolate the chambers 6a and 7a of the rams 6 and 7 again and consequently to lock the stays 2 and 3 in the position of equilibrium which they reached during their progressive contact with the ground.

Moreover, it will be noted that the abutment of the stays on the ground is not a simple contact with the ground but is on the contrary independent, to a certain extent, of the ground, since it corresponds to a certain quantity of fluid introduced, on the one hand, in the chamber 8a on the other hand in the two chambers 6a and 7a. An overall course of extension of the stays may thus be defined, which stays ensure a very firm abutment thereof on the ground. It will also have been noted that after having been extended out and after the distributors 11 and 20 have been returned to their initial positions, the support faces of the four stays 2 to 5 constitute an undeformable out-of-true quadrilateral.

Therefore, it can be seen that the stays 2 and 3 will be immobilized in variable positions which depend on the shape of the ground. For example, if stay 2 rapidly abuts on the ground then the fluid circulating within the conduit 14 will cause only ram 7 and the stay 3 to extend out until the sum of the volumes in chambers 6a and 7a correspond to the volume of chamber 8a of ram 8 during complete extension of the ram 8.

It is understood that the lengths of the rams 6 and 7 as well as the ratio of fluids introduced by the divider 13 into conduits 13 and 14 are determined by the construction of the rams, the size of the hydraulic chambers, the size of the stays, and the like, i.e., the shape of the vehicle as determined by the use and its manufacture so that all of the stays are in abutment on the ground.

It may be that after the first operational phases of the vehicle the ground is locally tamped and that the initial clamping of the stays 2 and 3 should be revised. That is, the control valve which has been previously arranged to establish communication between chambers 6a and 7a is then arranged in its second position whereby the chambers 6a and 7a are isolated by the action on the distributor 20. To this end, it is sufficient solely to unblock the distributor 20. The pressurized fluid coming from the pump 9, arrives again, through conduits 10, 17 and 22, at the control valve 21 which re-establishes the communication of the chambers 6a and 7a of the rams 6 and 7. The stays 2 and 3 may thus take a new position of equilibrium and be locked therein by returning the distributor 20 into its initial position. It can therefore be seen that for repositioning stays 2 and 3, the stays 4 and 5 may be held in the same position in relation to the chassis. The chambers 6b and 7b are already in communication with each other through the conduit 16. The fluid contained in the chambers 6b and 7b is at a substantially zero pressure since the weight of the vehicle leans on the four stays and has the effect of keeping the fluid under pressure in chambers 6a and 7a, as a result, the non-return valves 24 which are piloted by the fluid pressure of the chamber 6b, i.e. by a fluid at a substantially zero pressure, remain closed. The non-return valves 24 therefore prevent the fluid contained in the chambers 6a and 7a on the one hand, and 8a on the other hand, from returning to the reservoir 19 through the conduits 14 and 15 and through the output divider 14. It will therefore be noted that the fluid contained in the chamber 8a remains enclosed therein and that then the stays 4 and 5 to which ram 8 is connected remain locked in the out position in mechanical abutment. A possible transfer of fluid contained in chambers 6a and 7a takes place between one chamber and the other depending upon the new balance which the vehicle takes on with the stays 2 and 3.

Finally, in order to lift the stays, the slide members of the distributors are suitably arranged, that of distributor 20 pushed towards the left. The pressurized fluid coming from 10 circulates in conduits 16. It controls during passage certain non-return valves 24, arranged on conduits 14 and 15. In this manner, fluid is introduced into the chambers 6b and 8b, pushes the pistons of the rams 6 and 8 and drives the fluid from chambers 6a and 8a which, without passing again through the output divider 13, arrives in the conduit 12, then in conduits 17 and 22. It then controls the control valve 21 which places chambers 6a and 7a in communication. The chambers 6a and 8a may therefore be completely emptied and the stays 2 to 5 may therefore be completely lifted.

It is understood that by construction the stays described herebefore are capable on a flat surface of reaching the ground and raising the vehicle so that the wheels are no longer in contact with the ground.

What is claimed is:

1. A stabilizing device for use with mechanical earthworking vehicles comprising a chassis; at least two groups of stabilizing stays mounted on said chassis, said first of said two groups of stays operatively connected to a single hydraulic ram means mounted on said chassis, for extending and retracting said stays, said second of said two groups of stays comprising a pair of stays mounted on said chassis, each of said pair of stays being operatively connected with a hydraulic ram means for extending and retracting each of said pair of stays, wherein the volume of the chamber of the hydraulic ram means of said first group of stays in the retracted position is proportional to the sum of the volumes of the chambers of the hydraulic ram means of said second group of stays in the retracted position, control means communicating to each of said ram means for selectively controlling the movement of said stays, said control means having a source of pressurized fluid, conduit means for supplying said fluid to said ram means and an output divider for controlling the distribution of said fluid to said hydraulic rams for maintaining the sum of the volume of the fluid in the hydraulic ram means of said second group proportional to the volume of the fluid in the hydraulic ram of said first group whereby the sum of the strokes of the stays of said second groups from their retracted positions presents a constant ratio with respect to the sum of the strokes of said stays of said first group from their retracted position.

2. The device of claim 1 including a control valve for selectively placing into communication with each other the chambers of the hydraulic rams of said second group of stays, and with said output divider.

3. The device of claim 2 including a fluid return conduit connected with each of the chambers of said rams, a fluid discharge reservoir, and a two-way distributor means for selectively placing said control valve in communication with said fluid turn conduit of said rams and said discharge reservoir.

* * * * *